Feb. 20, 1934.    D. B. PERRY    1,947,734
POWER TRANSMISSION CHAIN
Filed March 6, 1933    2 Sheets-Sheet 1
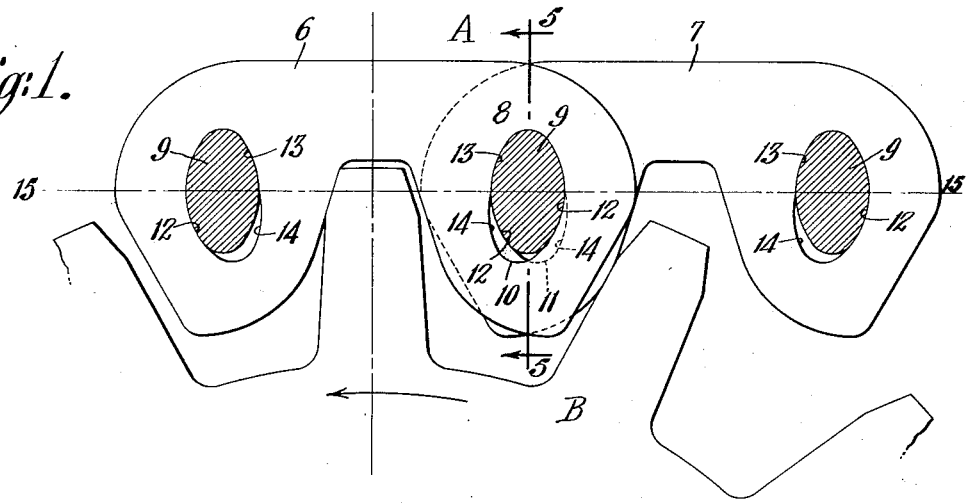
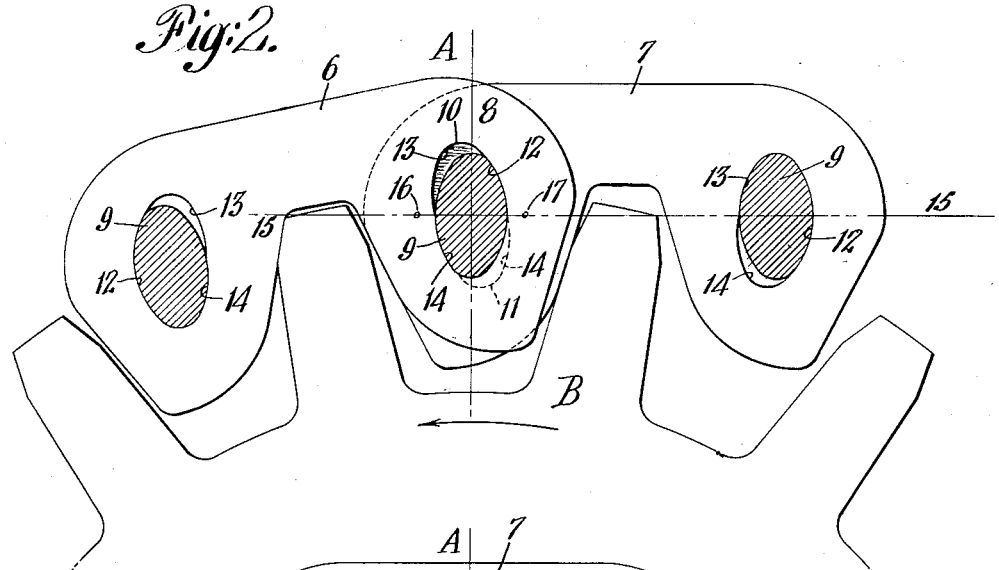
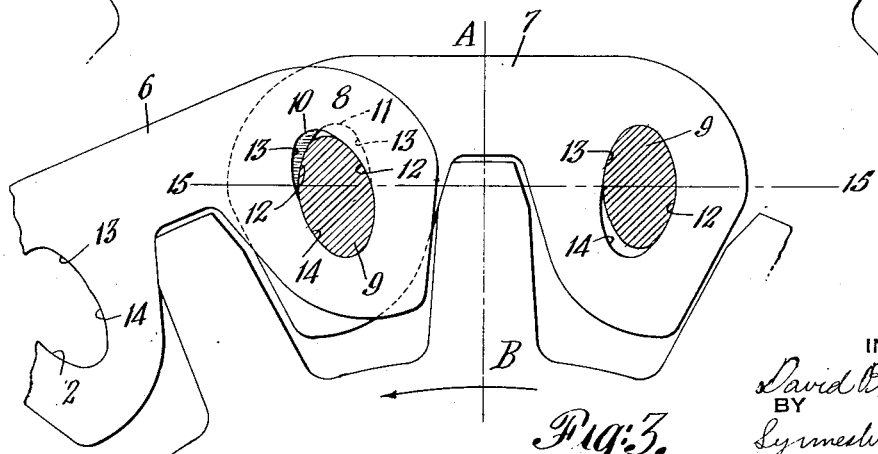
INVENTOR
David B. Perry
BY
Symmes Wedd & Lechner
ATTORNEYS Feb. 20, 1934.   D. B. PERRY   1,947,734
POWER TRANSMISSION CHAIN
Filed March 6, 1933   2 Sheets-Sheet 2

INVENTOR
David B. Perry
BY
Symnestvedt & Lechner
ATTORNEYS

Patented Feb. 20, 1934

1,947,734

UNITED STATES PATENT OFFICE

1,947,734

POWER TRANSMISSION CHAIN

David Barnes Perry, Ithaca, N. Y., assignor to Morse Chain Company, Ithaca, N. Y., a corporation of New York Application March 6, 1933. Serial No. 659,758

10 Claims. (Cl. 74—32)

This invention relates to power transmission chains and particularly to those of the silent type.

One of the primary objects of my invention is the provision of an improved chain which is of extreme simplicity, inexpensive to manufacture, efficient, durable, and quiet in operation.

Another object of my invention is the provision of a chain of the above character in which the amount of bend of the chain is controlled in an improved manner.

A further object resides in the provision of an improved joint for chains of the above character adapted for use in duplex chains, i. e., chains having both faces adapted to engage sprockets for drive, as well as in chains having only one face so adapted.

Still another object resides in the provision of a power transmission chain in which an improved joint is employed having but a single pintle part.

Another object resides in the provision of a joint of the character described having an arc of driving contact of such extent as to be extremely effective.

How the foregoing, together with such other objects and advantages as may hereinafter appear, or are incident to my invention, are obtained, is illustrated in preferred form in the accompanying drawings, wherein—

Figure 1 is a side elevation of a portion of a chain embodying my improvements, with the joints appearing in section and illustrating the position of the parts when the chain is straight;

Figure 2 is a similar view illustrating the position of the parts with partial articulation of the chain;

Figure 3 is a similar view illustrating the position of the parts with complete articulation of the chain;

Figure 4:
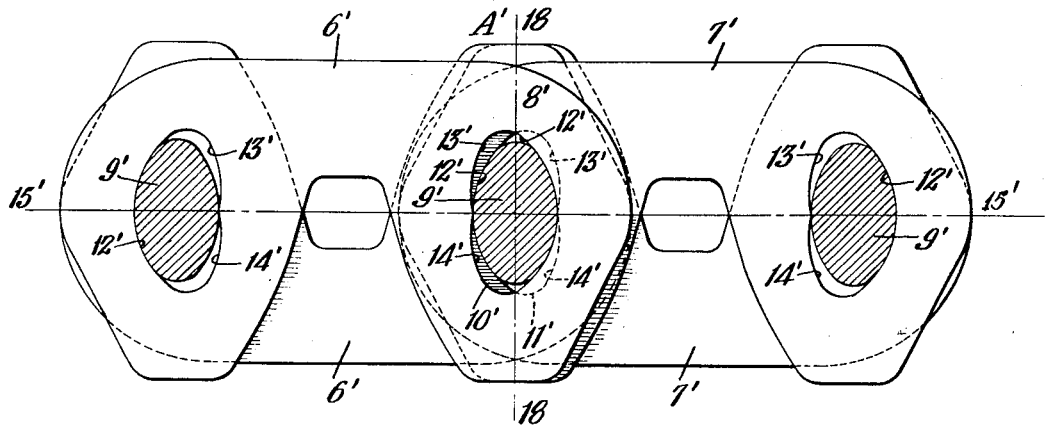
Figure 4 is a view similar to Figure 1 but illustrating the application of my invention to a duplex type of chain.

Referring to the drawings, I have illustrated a piece of chain A, and a sprocket B, which may be assumed to be a driving sprocket rotating in the direction of the arrow. The chain comprises a plurality of sets of links 6 and 7, and joints 8 for connecting them. The links are constructed in the usual manner of silent chains, i. e., of interspersed arch-shaped link plates of the number necessary to make the chain of the desired width.

The joint 8 comprises a pintle part or pin 9 of double convex or oval form, and pintle receiving apertures 10 and 11 in the overlapping plates of the sets of links 6 and 7 respectively.

The links are provided with such pintle apertures adjacent each end and in the form of chain illustrated in Figures 1, 2, and 3, they are inclined from the vertical. Each aperture is provided with a concave bearing surface 12 and a double concave seating surface 13—14, it being noted that the long dimension of the apertures is greater than the long dimension of the pintles.

With the connected links in their straight position as shown in Figure 1, the pintle fits the portions of the apertures in the connected links above the dot and dash line 15—15, and below this line the pintles coincide with the lower portions of the bearing surfaces 12—12, and clearances exist between the lower portions of the pintles and the seat portions 14—14 of the apertures.

Referring now to Figure 2, it will be seen that as the driving sprocket rotates in the direction of the arrow the link 7 turns about the center 16 of the concave bearing surface 12 of the link 6, and causes the pintle 9 to slide or shift on said surface until it has seated in the lower seat 14 of said link. In other words, while this motion is taking place the pintle moves with the link 7, turns about the center 16, and slides on the coacting edge surface 12 of the aperture in the link 6. Thus with the amount of articulation shown in Figure 2, while the pintle shifts with respect to the link 6 it maintains its same relative position in link 7, and the clearance in link 6 is then above the line 15—15, but the clearance between the pintle and the link 7 remains below the line as before. As the sprocket continues to rotate, articulation of the chain is completed as illustrated in Figure 3. In moving from the position illustrated in Figure 2 to that illustrated in Figure 3 the pintle ceases moving with the link 7 since it has seated in the lower portion of the aperture of the link 6, and the link 7 moves about the center 17 which causes the bearing surface 12 of the link 7 to slide on the coacting surface of the pintle until the pintle finally seats in the lower seating surface of the link 7. It will thus be seen that the position of the parts which existed in Figure 1 is reversed, for now the pintle fits the apertures in both links below the line 15—15, and above the line the pintles coincide with the upper portion of the bearing surfaces 12—12, and a clearance exists between the upper portions of the pintles and the seat portions 13—13 of the apertures.

Figure 6:
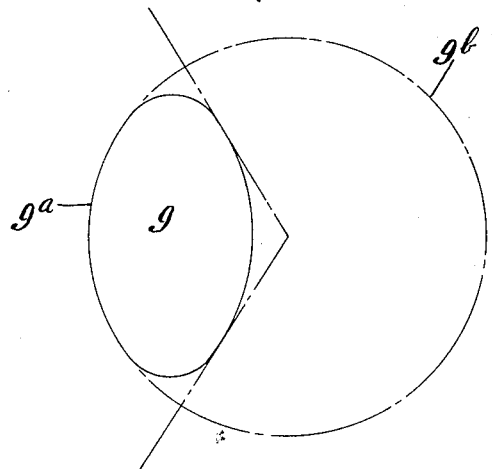
Figure 6 is a diagrammatic view illustrating the arc of driving contact of the joint.

The pintle part 9 is of such proportion that the length of the bearing or arcuate surface 9a (see Fig. 6) which coacts with the link aperture is in the neighborhood of or does not exceed approximately 120 degrees of an imaginary circle 9b struck around the centre of curvature of the surface. Thus a very effective arc of contact results, it being pointed out that it is generally considered that the effective arc of contact of a cylindrical shaft in a cylindrical bearing, due to the necessary clearance, never exceeds approximately 120 degrees. It is to be understood, however, that I do not limit myself strictly to an arc of 120 degrees, as this may vary somewhat under different circumstances. Thus I have provided a joint having an extremely effective arc of driving contact with the link and in which a large bearing surface for the joint is provided without weakening the strength of the link as would be the case if a round pintle were employed having the same effective arc of driving contact.

The particular type of joint employed also permits the chain to enter the sprocket in a manner that reduces the whip or vibration caused by the polygonal action which is common in chains having joints of the cylindrical or round type, for example.

As above pointed out, the pintle receiving apertures are tilted, and in this instance the amount of tilt is such that the chain cannot bend backward from the line of pull. In other words, as viewed in Figure 1, the chain cannot bend upwardly and is restricted to bend downwardly around the sprocket. It will be noted that this non-back bend characteristic is obtained in a very simple manner, and without the employment of extra parts in the chain. By employing apertures and pintles of the form described, I may control the angular motion or degree of back bend by varying the major axis of the pintle section, and control the pitch of the chain by the minor axis. The second axial dimension may be changed without changing the radius of curvature, and this makes it possible to modify the pitch without disturbing the accuracy of the bearing surfaces. The amount of tilt may also be adjusted to suit the particular requirement of bend.

Such control of the back bend is very desirable in that it substantially eliminates whipping of the chain, which feature is very desirable when the chains are employed in automobile front end drives, for example, where quiet action and elimination of vibration are important factors.

In Figure 4 I have illustrated the application of my improved joint to a chain of the duplex type in which sprockets may be engaged for drive by both chain faces. In this instance the major axis of the joint 8' is vertical when the chain is straight, as indicated by the dot and dash line 18—18, and the joint is symmetrically disposed with respect to the horizontal line 15'—15'. By so arranging the joint, like clearances are provided between the pintle 9' and the seating surfaces 13' and 14' of the pintle receiving apertures 10' and 11' when the chain is straight, and therefore equal bend can take place in both directions. The action of the joint when the chain articulates in either direction is similar to that described above.

Figure 5:
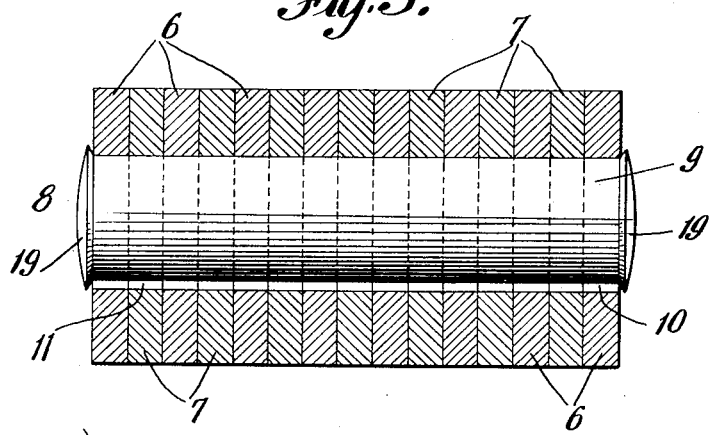
Figure 5 is a cross-section taken on the line 5—5 of Figure 1.

Referring to Figure 5, it will be seen that the pintle parts 9 may be held in place laterally in any suitable manner, as for example by forming heads 19 on them.

The action of a chain constructed in accordance with my invention when the chain drives the sprocket is the same as above described, as will be understood by referring to Figure 1, and assuming that the chain is entering the sprocket from the left and driving it in a clockwise direction.

I claim:

1. An oscillating joint for chains comprising adjacent link members each carrying a concave bearing surface and a double concave seating surface, and a floating pintle member connecting adjacent link members, said pintle member having double convex bearing surfaces arranged for sliding frictional contact with the concave bearing surfaces and for seating contact with the double concave bearing surfaces.

2. An oscillating joint for chains comprising two parts or links adapted to be hinged together and each provided with a concave bearing surface and a double concave seating surface, and a pintle member connecting said links, said pintle member having convex bearing surfaces and arranged to slide bodily in the concave surfaces as the chain bends, and to seat in the double concave bearing surfaces after a predetermined amount of bend has taken place.

3. An oscillating joint for chains comprising two parts or links adapted to be hinged together and each provided with a concave bearing surface and a double concave seating surface, and a pintle member connecting said links, said pintle member having convex bearing surfaces and arranged to slide bodily in the concave surfaces as the chain bends, and to seat in the double concave bearing surfaces after a predetermined amount of bend has taken place, the limit of bend in one direction being controlled by one and the limit of bend in the other direction being controlled by the other of said double concave seating surfaces.

4. A joint for sprocket chains comprising in combination cooperating link members each having a single concave bearing surface and an opposed double concave bearing surface, and a single pintle member connecting adjacent link members, said pintle member being arranged between said surfaces to slide on the single concave surfaces and seat in the double concave surfaces as the chain articulates.

5. In a silent chain, a joint therefor comprising a pin of oblong cross-section, and apertures in adjacent links for receiving the pin to connect the links together, each aperture having a single concave edge portion engaging the pin with sliding contact when the chain articulates and a double concave edge portion forming seats for the pin adapted to limit articulation of the chain in both directions.

6. A joint for sprocket chains comprising in combination cooperating link members each having a single concave bearing surface and an opposed double concave seating surface, and a single pintle member connecting the link members, said pintle member being arranged between said surfaces to slide on the single concave surfaces and seat in the double concave surfaces as the chain articulates, said surfaces being disposed at angles such that articulation of the chain is limited to one direction from a straight line.

7. In a silent chain, a joint therefor comprising a pin having double convex bearing surfaces, and apertures in adjacent links for receiving the pin to connect the links together, each aperture having a single concave edge portion engaging the pin with sliding contact when the chain articulates and a double concave edge portion forming seats for the pin adapted to limit articulation of the chain in both directions, said apertures being tilted relative to the line of pull of the chain.

8. A joint for sprocket chains comprising in combination cooperating link members each having a single concave bearing surface and an opposed double concave seating surface, and a single pintle member connecting the link members, said pintle member being arranged between said surfaces to slide on the single concave surfaces and seat in the double concave surfaces as the chain articulates, said surfaces being so disposed with respect to the line of pull of the chain that articulation of the chain can take place in both directions from said line of pull.

9. A joint for sprocket chains comprising in combination cooperating link members each having a single concave bearing surface and an opposed double concave bearing surface, and a single pintle member connecting the link members, said pintle member being arranged between said surfaces to slide on the single concave surfaces and seat in the double concave surfaces as the chain articulates, said pintle member being proportioned so that its arc of contact with the concave bearing surfaces of the link members approximates 120 degrees.

10. In a silent chain, a joint therefor comprising a pin having double convex bearing surfaces, and apertures in adjacent links for receiving the pin to connect the links together, each aperture having a single concave edge portion engaging the pin with sliding contact when the chain articulates and a double concave edge portion forming seats for the pin adapted to limit articulation of the chain in both directions, said apertures being disposed so that they are symmetrical around both horizontal and vertical lines drawn through the center of the joint.

DAVID B. PERRY.